United States Patent Office 2,997,445
Patented Aug. 22, 1961

2,997,445
ACID-GAS ABSORBENT
Lewis J. Nuhn, Kinderhook, N.Y., assignor to McGraw-Edison Company, Elgin, Ill., a corporation of Delaware
No Drawing. Filed Apr. 18, 1958, Ser. No. 729,222
3 Claims. (Cl. 252—192)

This invention relates to improved acid-gas absorbents which have better overall characteristics than the absorbents heretofore provided in respect of life, efficiency, stability and freedom from dusting.

Acid gas absorbents are used primarily in breathing systems for absorbing the carbon dioxide of the exhalant, such as in closed re-breathing systems for administering anesthetics, and in respirators and gas masks for warfare, fire-fighting, diving, etc.

The most widely used acid gas absorbents are so-called soda lime composed of sodium hydroxide, calcium hydroxide and water, and a barium hydrate-lime composition known commercially as Baralyme and covered by U.S. Patent No. 2,322,206, which is a pelleted composition of hydrated barium hydroxide and calcium hydroxide. Each of these absorbents have however certain deficiencies. For instance, the water content of soda lime—which must necessarily be present in order to maintain the absorptive activity of the product—is readily lost through evaporation. It is therefore necessary that soda lime be stored in hermetically sealed containers and that it be used under closely controlled conditions. The barium hydrate-lime material is free of the above deficiency because its moisture is locked in mainly by waters of crystallization, but this product is subject to erosion and dusting, and tends to diffuse light buoyant particles off into the atmosphere during handling and use.

It is an object of the present invention to provide a modified form of the barium hydrate-lime composition which has improved life and efficiency, stable operating characteristics, and a well-nigh substantial freedom from dusting and from diffusing of light buoyant particles into the atmosphere during handling and use.

The present invention resides in using a novel proportion of the ingredients: hydrated barium hydroxide, calcium hydroxide, water and caustic alkali, preferably potassium hydroxide, and in aggregating these ingredients into a porous product by a suitable pressure treatment inducing also beneficial heating from heat of compression.

It is known that the British Patent 277,540, dated September 22, 1927, discloses an acid gas absorbent comprising the same ingredients as are used in the present product. However, the British patent uses a preponderance of hydrated barium hydroxide in the ratio of three parts of this hydroxide to two parts of slaked lime, and uses about 14% water by weight in the initial mix. It is taught that the hydrated barium hydroxide and water are heated to a fluid condition, that the lime is then stirred into the fluid mass, and that when the incorporation is complete the mass is cooled, after which it is broken into granules. By using such high proportion of hydrated barium hydroxide and of water the heated solution thereof is capable of wetting the lime and of becoming evenly mixed therewith as the lime is stirred into the fluid mass.

In contrast, applicant uses a preponderance of slaked lime relative to the barium hydrate and adds also some caustic alkali, preferably potassium hydroxide. A mix of the ingredients in these proportions cannot be aggregated into a solid product by the method taught by the above British patent because the amount of solution here used is insufficient to wet the lime. This mix can however be aggregated into a shaped porous product by pressure treatment with its accompanying heat of compression. Since this new product contains a preponderance of lime having a much higher absorptive capacity than barium hydroxide, it results in a product which is shown by tests to have about 100% better life and efficiency than the product taught by the above British patent. Moreover, the novel introduction of the potassium hydroxide into the hydrated barium hydroxide-lime mix, preferably in a proportion of about 5% by weight of potassium hydroxide to that of the final product, is found to have the beneficial effect of increasing the life and efficiency about 40% over that of the product of Patent 2,322,206 and of mitigating also the dusting problem which has been characteristic of that product.

The barium hydroxide is used preferably in its fully hydrated form and has the beneficial effect of providing an intimate presence of water with the lime particles to give the latter their high absorptive activity and of recrystallizing under pressure and heat treatment to lock in the lime particles and provide a strong solid final product. The minimum proportion of hydrated barium hydroxide suitable for these purposes is of the order of 10% by weight of the final product. Preferably, the present product is made with about such minimum proportion of the hydrated barium hydroxide in order to achieve maximum absorptive efficiency, but the invention can be carried out still with markedly improved results when higher proportions of the hydrated barium hydroxide are used within however such lower range that require aggregation of the product by pressure treatment instead of by the heat and water treatment taught by the British patent, such permissible range in the proportions of the hydrated barium hydroxide to the total product being between about 10% and 25%. Also, for purposes of the invention the potassium hydroxide may be added in the proportions of 1% to 10% by weight of the final product.

X-ray diffraction measurements have shown that the potassium hydroxide catalyzes the barium hydrate to make it a highly active base for acid gas absorption. Also, after the product of the present invention is subjected to the pressure treatment and formed into self sustaining bodies it is provided with about 10% by weight of free moisture. Because of the presence of the potassium hydroxide ingredient there is very little evaporation of this moisture under normal conditions of storage and of use. It is believed the presence of a hydrate of barium and potassium hydroxides in a complex crystalline structure and in homogeneous mixture with the lime tends to lower the vapor pressure of the composition so that the free moisture remains in the product. These explanations are given as an aid to a possible understanding of a physical and chemical composition of the product without intending however any unnecessary limitations thereto.

A satisfactory method of preparing the new absorbent product of my invention may be carried out as follows: Into a blender or mixer of conventional design there is added, for example, 54 pounds of barium octohydrate crystals and 400 pounds of calcium hydroxide. To these dry ingredients is added a hot saturated solution of potassium hydroxide, made by dissolving about 26 pounds of the dry material with 14½ pounds of water, so as to provide an intimate homogeneous mixture of the ingredients. The introduction of the liquid potassium hydroxide and the simultaneous physical mixing of the ingredients is carried out preferably over a period of about 15 minutes. Then the mixture is fed into a compression apparatus or pelleting machine, as described in Patent No. 2,322,206, to form a shaped hard product. The pressure to which the mixture is subjected is typically several tons per square inch so as to provide beneficial heating from heat of compression, but the heating is to be less than that which would liberate the waters of crystallization. If the compressed mixture is formed into large blocks instead of into pellets of desired size, it is next granulated and screened to desired size. Thereupon the granules or pellets are transferred to a moisture treating apparatus in which water is introduced through jet nozzles to provide the final product with a free water content of the order of 10% by weight. This final product has a dry feel and has good structural strength due to the bond formed by a recrystallization of the barium hydrate with also some possible crystallization of the calcium and potassium hydroxides induced by the pressure treatment.

A second method, for example, of producing the new absorbent according to my invention may be carried out as follows: Into a blender or mixer of conventional design there is introduced 150 pounds of water, 150 pounds of calcium hydroxide and 10 pounds of potassium hydroxide. The ingredients are mixed thoroughly over a period of 15 to 30 minutes. The mixture is then poured into flat shallow pans and placed in an oven at a temperature of about 130° until the mixture is in the form of a dry cake. This cake is then broken into fragments and fed by a screw conveyor, together with about 22 pounds of barium octohydrate crystals, into a dry blender. The mixing by the blender is continued from 15 to 30 minutes. This mixture is then compressed into hard cakes as above described, and is then granulated and screened to desired size. Next the granulated product is transferred to a moisture treating device wherein water is introduced through nozzles to supply the desired content of free water up to about 10% by weight. Such final product possesses the novel characteristics and properties of my invention.

The foregoing disclosures intended to be illustrative and not limitative of my invention since the same is subject to changes and modifications without department from the scope of my invention, which I endeavor to express according to the following claims.

I claim:

1. A substantially dry solid product for absorbing acidic gases, consisting essentially of 10% to 25% barium hydroxide containing water of crystallization, 1% to 10% potassium hydroxide, about 10% free water and the balance slaked lime.

2. A substantially dry solid product for absorbing acidic gases, consisting essentially of about 12% hydrated barium hydroxide, 5% potassium hydroxide and 10% free water, and the balance calcium hydroxide.

3. A substantially dry product for absorbing acidic gases consisting essentially of a mix aggregated into shaped bodies by compression and composed of 10% to 25% by weight of barium hydroxide containing water of crystallization, 1% to 10% by weight of a saturated solution of potassium hydroxide and the balance slaked lime, and said product containing about 10% by weight of added free moisture.

References Cited in the file of this patent

UNITED STATES PATENTS

| | | |
|---|---|---|
| 1,207,273 | Cadman | Dec. 5, 1916 |
| 1,441,696 | McNeil | Jan. 9, 1923 |
| 2,322,206 | Gardenier | June 22, 1943 |
| 2,395,842 | Bergstrom | Mar. 5, 1946 |
| 2,470,214 | Egan | May 17, 1949 |

FOREIGN PATENTS

| | | |
|---|---|---|
| 277,540 | Great Britain | Sept. 22, 1927 |
| 198,519 | Germany | May 25, 1908 |
| 732,771 | Germany | Mar. 11, 1943 |